(12) United States Patent  (10) Patent No.: US 8,798,914 B2
Gum  (45) Date of Patent: Aug. 5, 2014

(54) NAVIGATING AT A WIRELESS DEVICE

(75) Inventor: Arnold Jason Gum, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 517 days.

(21) Appl. No.: 12/467,135

(22) Filed: May 15, 2009

(65) Prior Publication Data

US 2010/0179750 A1 Jul. 15, 2010

Related U.S. Application Data

(60) Provisional application No. 61/144,188, filed on Jan. 13, 2009.

(51) Int. Cl.
| | | |
|---|---|---|
| G01C 21/00 | (2006.01) | |
| G08G 1/123 | (2006.01) | |
| G01C 21/34 | (2006.01) | |
| G01S 1/00 | (2006.01) | |

(52) U.S. Cl.
USPC ........... 701/410; 701/408; 701/409; 701/418; 701/438; 701/468; 701/541

(58) Field of Classification Search
USPC ........................................ 701/201, 400–541
See application file for complete search history.

(56) References Cited

U.S. PATENT DOCUMENTS

| | | |
|---|---|---|
| 2004/0002813 A1 | 1/2004 | Silvester |
| 2004/0054468 A1 | 3/2004 | Yamada et al. |
| 2007/0016362 A1 | 1/2007 | Nelson |
| 2007/0219706 A1 | 9/2007 | Sheynblat |
| 2007/0229549 A1* | 10/2007 | Dicke et al. ................... 345/676 |
| 2009/0006994 A1* | 1/2009 | Forstall et al. ................ 715/764 |

FOREIGN PATENT DOCUMENTS

| | | |
|---|---|---|
| DE | 10134108 | 1/2003 |
| EP | 0684592 A2 | 11/1995 |
| EP | 1162560 A2 | 12/2001 |
| EP | 1909069 A1 | 4/2008 |
| EP | 1944724 A1 | 7/2008 |
| TW | 200724867 | 7/2007 |
| TW | 200733014 | 9/2007 |
| WO | WO0242718 A1 | 5/2002 |

OTHER PUBLICATIONS

International Search Report & Written Opinion—PCT/US2010/020908—International Search Authority—European Patent Office—May 3, 2010.
Taiwan Search Report—TW099100841—TIPO—May 14, 2013.

* cited by examiner

*Primary Examiner* — Resha Desai
(74) *Attorney, Agent, or Firm* — Linda Gunderson (57) ABSTRACT

Apparatuses and Methods of navigating from a current position to a destination location at a mobile device are provided. A navigation program is launched at the mobile device, and a selection of a calendar event from a calendar program is received, where the calendar event is an entry in the calendar program. A location associated with the received calendar event location is determined, and a destination location is determined based on the associated location. The navigation program generates navigation instructions (e.g., turn-by-turn directions, map information, etc.) from a current location of the mobile device to the destination location. In an alternative aspect, instead of a calendar program, the associated location can be retrieved from a given contact in a contact list or program.

9 Claims, 7 Drawing Sheets

FIG. 4
NAVIGATION MENU

FIG. 5
FIND DESTINATION MENU

NAVIGATING AT A WIRELESS DEVICE

CLAIM OF PRIORITY UNDER 35 U.S.C. §119

The present Application for Patent claims priority to Provisional U.S. Application Ser. No. 61/144,188, entitled "Navigating at a Wireless Device," filed Jan. 13, 2009, assigned to the assignee hereof, and expressly incorporated herein by reference.

FIELD OF DISCLOSURE

Aspects of the present invention are directed to navigating to a destination location using a wireless device.

BACKGROUND

Conventionally, navigation software based on position information (e.g., SPS, GPS, etc.) has been implemented via stand-alone navigation devices. However, navigation software is rapidly being adopted by "all-in-one" portable devices, such as mobile phones, which can additionally function as a cell phone, text messager, MP3 player, camera, etc.

Portable devices often have relatively awkward user inputs. A high priority for portable devices is size reduction, such that implementing, for example, a space efficient keyboard type-input device, is difficult to achieve (e.g., by sacrificing display size, via a display that doubles as a touch-screen device, etc.). Due to these size constraints, portable devices typically have a user input mechanism that is more complicated as compared to a keyboard/mouse interface for a desktop computer or laptop.

The awkward user entry that is typical of portable devices decreases their utility in situations such as when a user is driving. For example, it is difficult to input a relatively long destination address into a portable device so that the navigation software included therein can map directions to that location.

Portable devices also increasingly include calendar software, such that a user of the portable device can enter in their daily or weekly schedule via the input mechanism of the portable device. Alternatively, portable devices import calendar information from another source (e.g., via an Internet download, docking to a laptop that includes the calendar information, etc.). The calendar information can include reminders of meetings, birthdays, and other events, and can further include an indicia of a location associated with the events (e.g., "Meeting at Brian's house at 3 pm", "Birthday Dinner at Olive Garden at 7 pm", etc.).

Portable devices can also include an address book or contact list feature, which includes a list of contacts and associated contact information. The contact information can include a telephone number of a contact, the contact's name, the contact's email address, Instant Message (IM) screen name and/or the contact's physical address.

Figure 1:
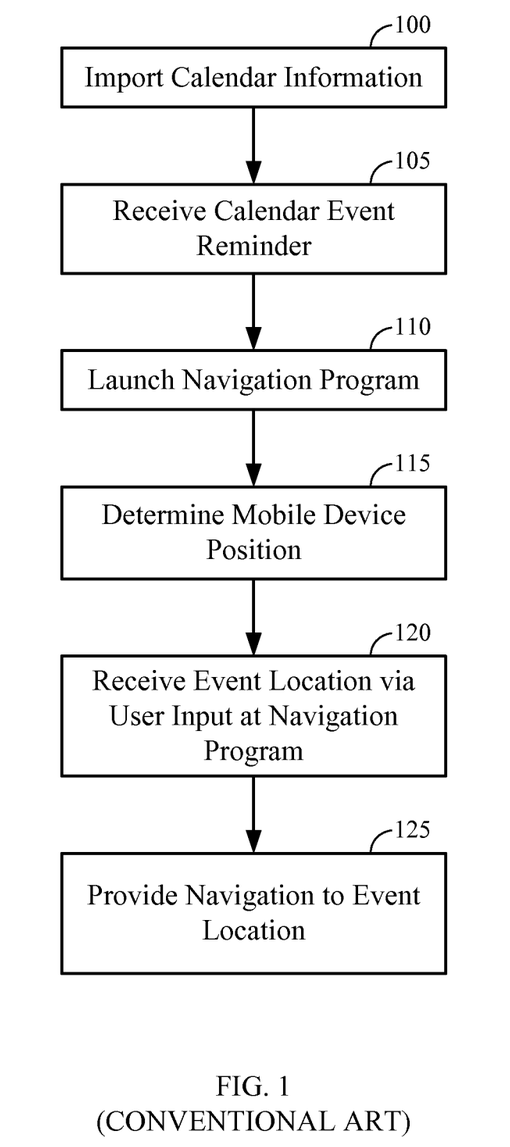
FIG. 1 illustrates a conventional process for navigating to a destination location associated with a calendar event at a mobile device.

FIG. 1 illustrates a conventional process for navigating to a destination location associated with a calendar event at a mobile device. Referring to FIG. 1, the mobile device imports calendar information, 100. For example, the mobile device can import calendar information by manually entering the calendar information into the mobile device, via retrieval from a laptop or desktop computer, or alternatively by importing the calendar information from an Internet location.

After importing the calendar information in 100, the mobile device runs a calendar program based on the imported calendar information and periodically alerts the user regarding upcoming calendar events. For example, the calendar program can alert the user 5 minutes before each event, an hour before each event, or can have different alert timeframes for different calendar events.

In 105, the mobile device alerts the user regarding an upcoming calendar event. For convenience of explanation, assume that the calendar event reminder received at 105 is for an event at a remote location, and that the user needs to figure out how to travel or "navigate" to the event location. Thus, in 110, the user launches a navigation program on the mobile device. Upon launching the navigation program in 110, the navigation program at the mobile device determines the location of the mobile device in 115. For example, the position determination of 115 can be performed based on satellite positioning system (SPS) (e.g., GPS), and/or any other position location determination process, as is known in the art.

After launching the navigation program in 110, the user enters the event location (e.g., a physical address, an intersection, etc.) into the navigation program as the destination address in 120. Alternatively, the event location can be entered before the location of the mobile device is determined. In 125, the navigation program maps a route from the determined mobile device position at 115 to the destination address entered at 120. While not shown explicitly within the process of FIG. 1, the navigation program can update the route dynamically, providing "turn by turn" navigation, such that a new route can be calculated if the user, for example, makes a wrong turn.

As discussed above, user entry of address information can be relatively awkward on a portable device, especially when the user is performing other concurrent activities such as driving a car. Accordingly, it can be relatively difficult and/or time-consuming to use conventional navigation programs to plot routes to calendar event locations on mobile devices due to the limited user interface and the manual user entry of destination addresses on mobile devices.

SUMMARY

Aspects of the invention are directed to methods of navigating from a current position to a destination location on a mobile device. A navigation program is launched at the mobile device, and a selection of a calendar event from a calendar program is received, where the calendar event is an entry in the calendar program. A location associated with the received calendar event location is determined, and a destination location is determined based on the associated location. The navigation program is generates navigation instructions (e.g., turn-by-turn directions, map information, etc.) from a current location of the mobile device to the destination location. In an alternative aspect, instead of a calendar program, the associated location can be retrieved from a given contact in a contact list or program.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an" and "the" are intended to include the plural forms as well, unless the context clearly indicates otherwise. It will be further understood that the terms "comprises", "comprising, ", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As will now be described in greater detail, aspects of the present invention are directed to a method and system for synchronizing a navigation program with calendar events and/or address programs at a mobile device. As will be discussed below, this synchronization may reduce the burden of a user of the mobile device having to manually enter calendar event locations into the navigation program. First, an example mobile device will be described with respect to FIG. 2, followed by a description of navigation/calendar processed performed at the example mobile device.

Figure 2:
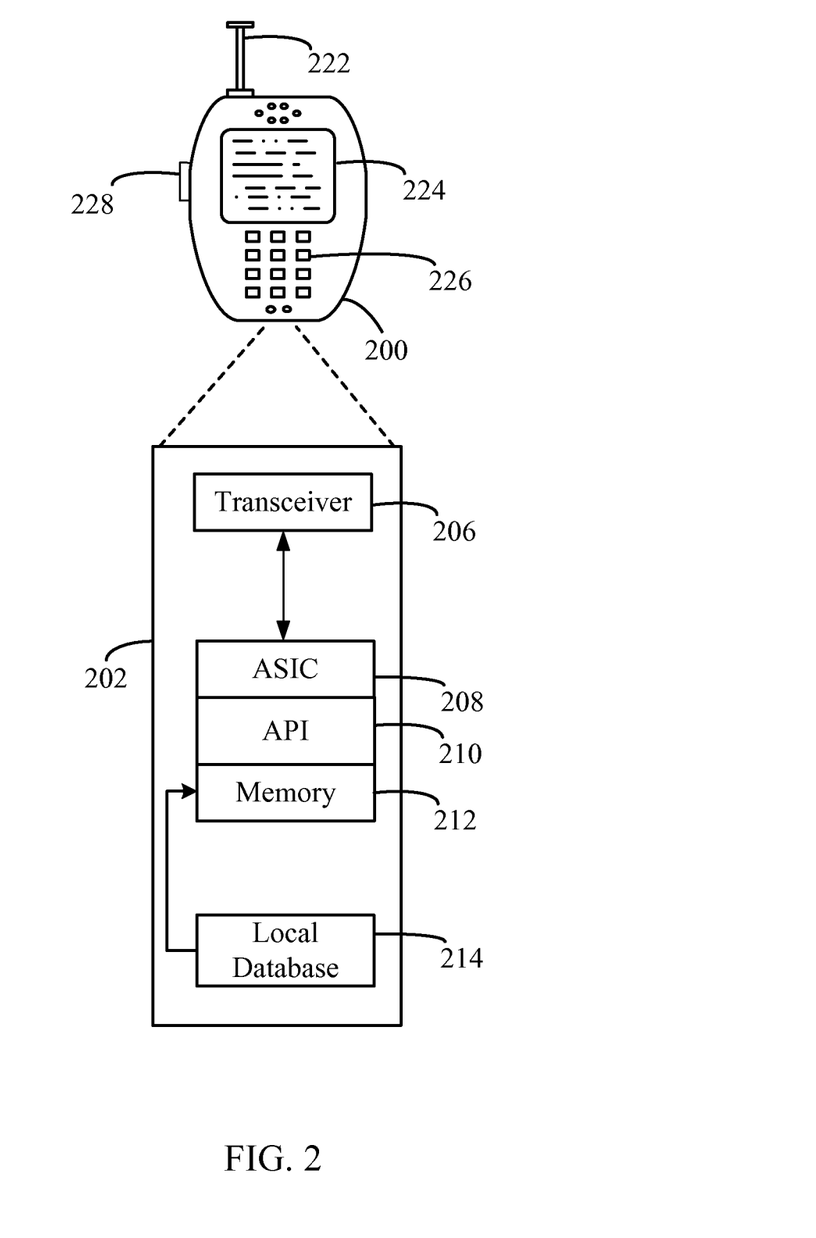
FIG. 2 illustrates a mobile device according to an aspect of the present invention.

FIG. 2 illustrates a mobile device 200, (here a wireless device), such as a cellular telephone. Referring to FIG. 2, the mobile device 200 includes a platform 202 that can receive and execute software applications, data and/or commands transmitted from an access network (not shown). The platform 202 can include a transceiver 206 operably coupled to an application specific integrated circuit ("ASIC" 208), or other processor, microprocessor, logic circuit, or other data processing device. The ASIC 208 or other processor executes the application programming interface ("API') 210 layer that interfaces with any resident programs in the memory 212 of the wireless device. The memory 212 can be comprised of read-only and/or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art. While not shown explicitly within FIG. 2, the mobile device 200 can include position location functionality, such as, a satellite positioning system (SPS) or global positioning system (GPS) for determining a position of the mobile device 200 with well-known SPS or GPS procedures, cellular-based position determination, a hybrid SPS/cellular determination, and the like.

Accordingly, an aspect of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 2 are to be considered merely illustrative and the invention is not limited to the illustrated features or arrangement.

Figure 3:
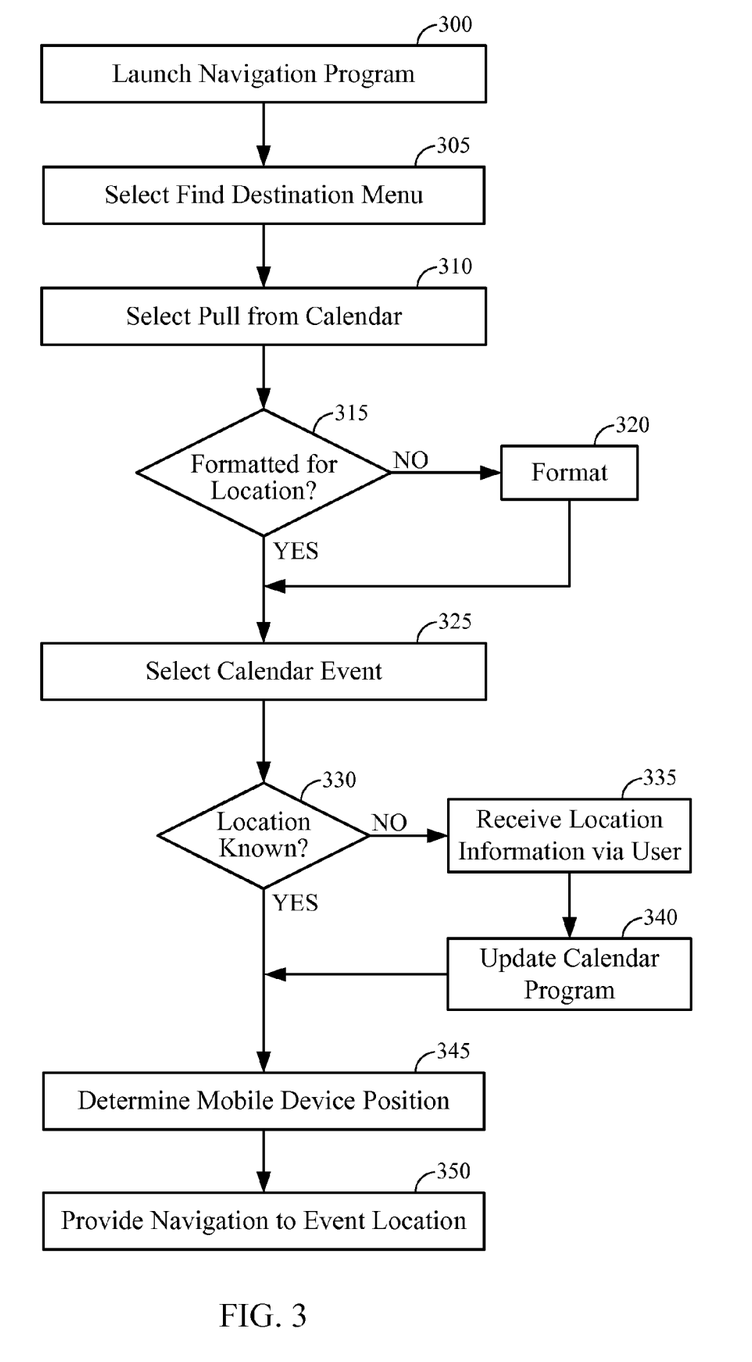
FIG. 3 illustrates a navigation process performed at the mobile device of FIG. 2 according to an aspect of the present invention.

FIG. 3 illustrates a navigation process performed at the mobile device 200 of FIG. 2 according to an aspect of the present invention. In 300, a user of the mobile device 200 launches a navigation program, and the display 224 of the mobile device 200 displays a navigation menu to the user.

Figure 4:
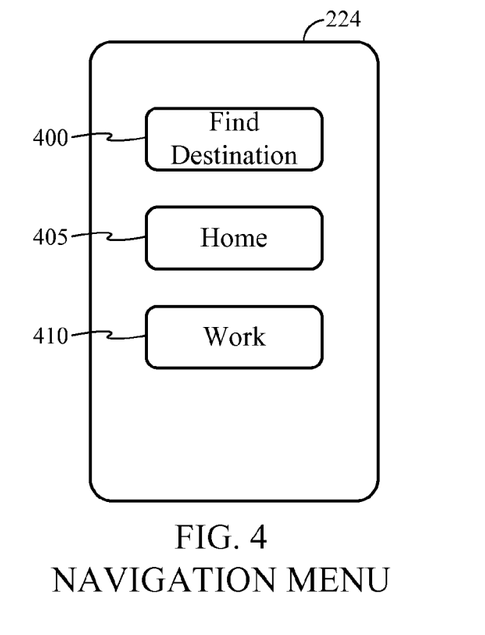
FIG. 4 illustrates a navigation menu according to an aspect of the present invention.

FIG. 4 illustrates a navigation menu according to an aspect of the present invention. As shown in FIG. 4, the navigation menu is displayed via the display 224 of FIG. 2 and includes a Find Destination icon 400, a Home icon 405 and a Work icon 410. The user of the mobile device 200 can select one of the icons 400, 405 or 410 via the keypad 226, in an example. Alternatively, the user of the mobile device 200 can select one of the icons 400, 405 or 410 via the display 224 itself if the display 224 is configured as a touch-screen. While not discussed in detail below, if the user of the mobile device 200 were to select the Home icon 405 or Work icon 410, the navigation program would provide turn-by-turn directions to a preprogrammed home address or work address, respectively. It will be appreciated that FIG. 4 illustrates only one example of a navigation menu, and other navigation menus can be configured differently. For example, the navigation menu can instead include a Favorites icon, a Recently Navigated icon, Get Map of Current Location icon, Find Restaurant/Gas Station/Bathroom, Pull from Address Book icon, etc. These examples have generally been consolidated as Find Destination icon 400 for the sake of simplicity, while it is appreciated that some of these icons could be on the initial navigation menu. Thus, any icon mentioned throughout the Figures could alternatively be positioned in a different menu location, and need not be limited to the particular examples illustrated and described herein.

Figure 5:
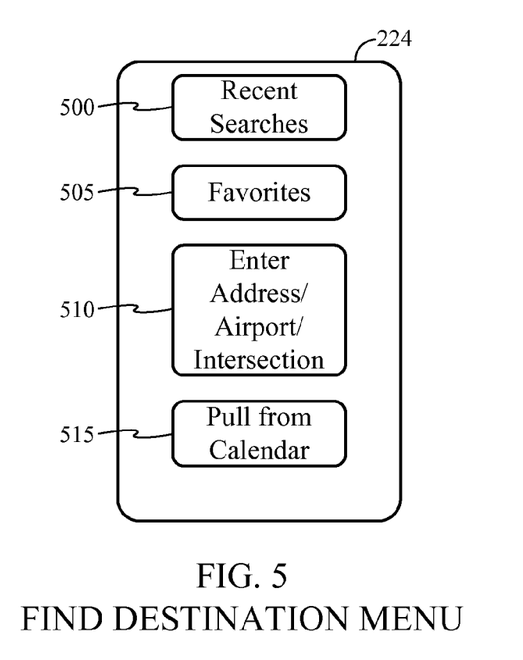
FIG. 5 illustrates a Find Destination Menu according to an aspect of the present invention.

Returning to FIG. 3, in 305, assume the user of the mobile device 200 selects the Find Destination icon 400. After the selection of 305, the display 224 transitions from the Navigation Menu of FIG. 4 to the Find Destination Menu of FIG. 5. Referring to FIG. 5, the display 224 displays the Find Destination Menu, which includes a Recent Searches icon 500, a Favorites icon 505, an Enter Address/Airport/Intersection icon 510 and a Pull from Calendar icon 515. While not discussed in detail below, if the user of the mobile device 200 were to select the Recent Searches icon 500, the user is prompted to select among recently entered addresses that have been entered into the navigation program. If the user of the mobile device 200 were to select the Favorites icon 505, the user is prompted to select among a set of addresses that have been designated by the user (e.g., other than the user's home or work address, which is selectable from the main navigation menu of FIG. 4). If the user of the mobile device 200 were to select the Enter Address/Airport/Intersection icon 510, the user is prompted to manually enter an address, airport name or intersection as a destination for the navigation program.

Returning to FIG. 3, in 310, assume the user of the mobile device 200 selects the Pull from Calendar icon 515. While this example is directed to a 'Pull from Calendar' option for the user, other aspects of the invention can include, for example, a 'Pull from Address Book' icon as well, wherein the user can select a contact from their address book to request navigation to an associated address (e.g., see description below with respect to FIG. 7). Next, the mobile device 200 determines whether a calendar program of the user is formatted for location, 315. As used herein, the calendar program is formatted for location when one or more Calendar Events stored within the calendar program are associated with a location (e.g., a physical or geographic location or coordinate, a contact in an address book having a physical location, an intersection, etc.). In an example, the navigation program can determine whether the calendar program is formatted by retrieving calendar information from the calendar program locally stored on the mobile device 200. While not illustrated explicitly within FIG. 3, the locally stored calendar program may be periodically synchronized with a remote calendar program (e.g., on a desktop or laptop computer), if available. For example, the remote calendar program may correspond to a more up-to-date version of the calendar program than the version maintained at the mobile device 200. For example, the calendar program can be generated at a laptop or desktop computer and then imported into the mobile device 200. In an example, the user can be prompted to enter a location each time the user adds a Calendar Event to the calendar program. In another example, the user can be provided with an option as to whether a Calendar Event is to be stored in associated with a location. Alternatively, when adding a Calendar Event to the calendar program, the user can select a contact from the user's contact list, where the selected contact is already associated with a given location (or locations) (e.g., during a generation or updating of the contact), and the user's selection thereby associates the (i) Calendar Event with (ii) the location(s) of the selected contact.

If the mobile device 200 determines that the calendar program is not formatted for location in 315, the mobile device 200 can attempt to format the calendar program for location in 320. For example, in 320, the mobile device 200 can attempt to download a version of the calendar program from an Internet location, a laptop or desktop computer, etc., which may include a more up-to-date version that is formatted for location. Once the mobile device 200 determines the calendar program is formatted for location, the process advances to 325. While not illustrated in FIG. 3, if the calendar program cannot be formatted for location (e.g., each Calendar Event in the user's calendar program is not associated with a location to which navigation can be achieved), then the user may choose between other modes of location entry, such as directory lookup, address book lookup and/or entering the address manually. In an example, the calendar event selection of 325 can be automatic, such that no user prompting is needed.

Figure 6:
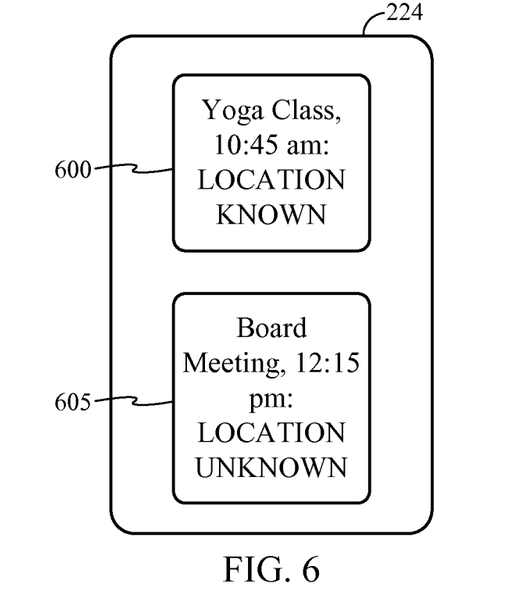
FIG. 6 illustrates a Pull from Calendar Menu according to an aspect of the present invention.

After the mobile device 200 determines that the calendar program is formatted for location, the display 224 transitions from the Find Destination Menu of FIG. 5 to the Pull from Calendar Menu of FIG. 6. Referring to FIG. 6, the display 224 displays a set of upcoming events from the calendar program that is previously established by the user. As discussed above, each Calendar Event in the calendar program is capable of including a location associated with the calendar event, or alternatively a link to a location stored in an address or contact list of the user.

Referring to FIG. 6, the Pull from Calendar Menu can include a Calendar Event icon 600 and a Calendar Event icon 605. While FIG. 6 illustrates the Pull from Calendar Menu as including two Calendar Events, it will be appreciated that other aspects of the present invention can include more or fewer Calendar Events dependent upon the calendar information stored in the calendar program (e.g., all Calendar Events for a given day can be displayed, within a two hour time period, and/or any other user-designated period).

As shown in FIG. 6, the Calendar Event icon 600 is for a yoga class at 10:45 am at a known location, and the Calendar Event icon 605 is for a Board meeting at 12:15 pm at an "unknown" location (as used herein, an "unknown" location means either that no location is associated with a particular Calendar Event despite the calendar program being formatted for location), or alternatively can mean that the location associated with the Calendar Event cannot be used to acquire an event location for the Calendar Event for which navigation can be achieved. For example, Calendar Event icon 605 can be unknown in the sense that no location is present, or alternatively can be unknown in the sense that a descriptively vague location is present (e.g., "Board Meeting in the Board room") that cannot be used by the navigation program to plot a route. However, if the Calendar Event included sufficient information such that the navigation program can figure out the destination location (e.g., "Board Meeting at My Work Address"), then the location would not be unknown. For example, a link to an address maintained in an address book or contact list would not render the location unknown even if the actual address were not maintained in direct association with the Calendar Event. While not shown in FIG. 6, it will be appreciated that one of the listed calendar events can be defaulted (e.g., highlighted or otherwise emphasized) to indicate what the mobile device considers to be the more likely option to navigate to next.

Returning to FIG. 3, in 325, the user is prompted to select one of the listed Calendar Event icons 600, 605. The user then selects the Calendar Event for which navigation is desired. For convenience of explanation, assume that the user selects the Calendar Event icon 600. Alternatively, the Calendar Event can be automatically selected by the mobile device 200. For example, the Calendar Event that is next in time may be automatically selected for navigation. Thus, in 330, the mobile device 200 determines whether the location associated with the selected Calendar Event icon 600 is known. Because the location associated with the Calendar Event icon 600 is known, the process advances to 345. In 345, the mobile device 200 determines its position (e.g., based on SPS or GPS, cellular-based position determination, or a hybrid SPS/cellular determination, etc.) based on location information provided from a service provider, etc.), and then provides turn-by-turn and/or map navigation to the event location, 350, as is known in the art. As will be appreciated, steps 345 and 350 are not necessarily performed in the order shown in FIG. 3 (e.g., step 345 may be performed in parallel with 350, etc.).

Returning to 325, assume that the user selects Calendar Event icon 605 instead of Calendar Event icon 600. In this case, in 330, the mobile device determines whether the location associated with the selected Calendar Event icon 600 is known. Because the location associated with the Calendar Event icon 600 is not known, the process advances to 335. In 335, the user is prompted to manually enter the Calendar Event location (e.g., via keypad entries inputted through the keypad 226, via touch-screen inputs at the display 224, etc.). Alternatively, in 335, the user can select a contact from the user's contact list, and a location associated with that contact is used. If more than one location is associated with a particular contact, the user can be prompted to select one of the associated locations, and the navigation program can set the destination address as the user's selection. In 340, the mobile device 200 optionally updates, if desired by the user, the calendar program such that future Board meetings are associated with the inputted location at 335 (e.g., by searching through the Calendar Program and appending the user entered location to each Calendar Event that includes 'Board Meeting'). Also, while not illustrated explicitly within FIG. 3, the address book can also be updated with the manually entered location information, if applicable. The process then advances to 345. In 345, the mobile device 200 determines its position (e.g., using SPS or GPS, location information provided from a service provider, cellular-based position determination or hybrid SPS/cellular determination, etc.), and then provides turn-by-turn navigation to the event location, 350, as is known.

As will be appreciated, formatting a calendar program for location such that Calendar Events are linked either directly or indirectly (e.g., via a reference to a contact from a contact list) to a location associated with a Calendar Event can reduce the number of keypad or touch-screen inputs required by the user. In other words, aspects of the present invention do not require the user to re-enter a destination address in a navigation program if that destination address has already been inputted in another program, such as a calendar program or contact list. The formatting of a calendar program for location can be performed remotely (e.g., at a laptop or desktop computer) from the mobile device 200 and then imported into or synchronized with the mobile device 200, although it is also possible that formatting the calendar program for location can be performed at the mobile device 200 itself. Also, if some Calendar Event entries remain unassociated with location, steps 335 and 340 in FIG. 3 allow the user another attempt to enter a location associated with those unformatted Calendar Events.

Figure 7:
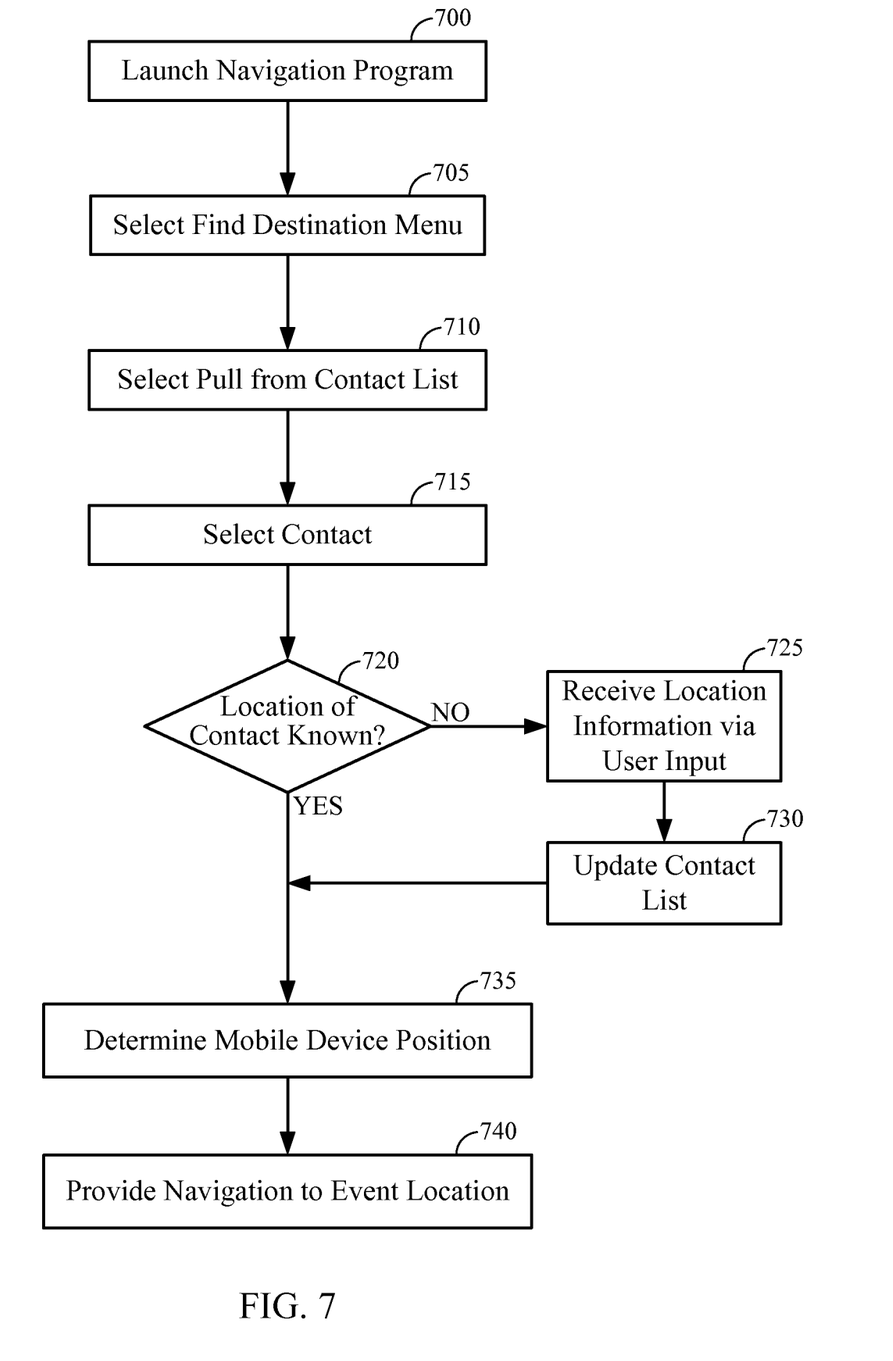
FIG. 7 illustrates a navigation process performed at the mobile device of FIG. 2 according to another aspect of the present invention.

However, other aspects of the present invention do not necessarily require a calendar program that is pre-formatted for location, as will now be described with respect to FIGS. 7-10. FIG. 7 illustrates a navigation process performed at the mobile device 200 of FIG. 2 according to another aspect of the present invention. In 700, a user of the mobile device 200 launches a navigation program, and the display 224 of the mobile device 200 displays the navigation menu of FIG. 4 to the user. For convenience of explanation, in 705, assume the user of the mobile device 200 selects the Find Destination icon 400. After the selection of 305, the display 224 transitions from the Navigation Menu of FIG. 4 to the Find Destination Menu of FIG. 8 (as opposed to the Find Destination Menu of FIG. 5).

Figure 8:
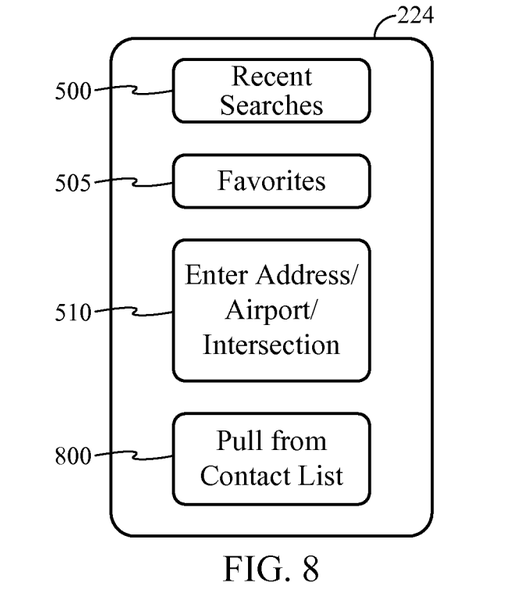
FIG. 8 illustrates a Find Destination Menu according to another aspect of the present invention.

Referring to FIG. 8, the display 224 displays the Find Destination Menu, which includes a Recent Searches icon 500, a Favorites icon 505, an Enter Address/Airport/Intersection icon 510 and a Pull from Contact List icon 800. While not shown in FIG. 7, it will also be appreciated that a pull from SMS or text message option could also be provided, wherein the mobile device selects a received message and the mobile device then determines the location from information included in the message (e.g., an address, intersection, etc.). Returning to FIG. 7, in 710, assume the user of the mobile device 200 selects the Pull from Contact List icon 800.

Figure 9:
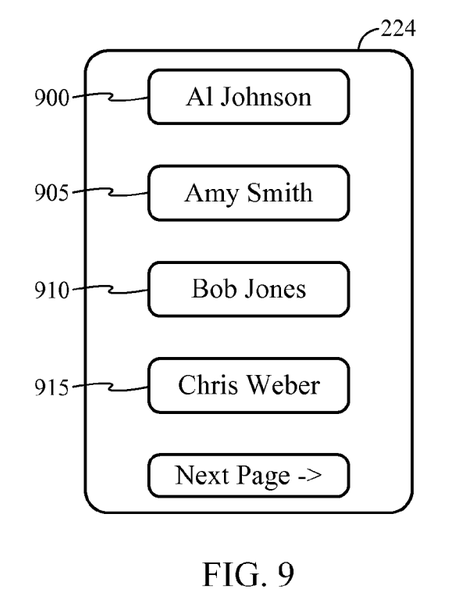
FIG. 9 illustrates a Pull from Contact List Menu according to an aspect of the present invention.

After the user selects the Pull from Contact List icon 800, the display 224 transitions from the Find Destination Menu of FIG. 8 to the Pull from Contact List Menu of FIG. 9. Referring to FIG. 9, the display 224 displays a list of the user's contacts and the display 224 prompts the user to select one of the displayed contacts.

The Pull from Contact List Menu includes contacts Al Johnson 900, Amy Smith 905, Bob Jones 910 and Chris Weber 915. While FIG. 9 illustrates the Pull from Contact List Menu as including four contacts per page, it will be appreciated that other aspects of the present invention can include more or fewer contacts per page (e.g., dependent upon the number of contacts present within the user's contact list, etc.).

Returning to FIG. 7, in 715, the user is prompted to select one of the listed contacts 900, 905, 910 and 915. The user then selects the contact to which navigation is desired. For convenience of explanation, assume that the user selects Chris Weber 915. Thus, in 720, the mobile device 200 determines whether the location associated with Chris Weber 915 is known. In an example, assume that a single location associated with Chris Weber 915 is known. In this case, the process advances to 735. In 735, the mobile device 200 determines its position (e.g., based on SPS or GPSs, based on location information provided from a service provider, cellular-based position determination, or a hybrid SPS/cellular determination, etc.), and then provides turn-by-turn navigation to the single, known location of Chris Weber, 740, as is known in the art.

Figure 10:
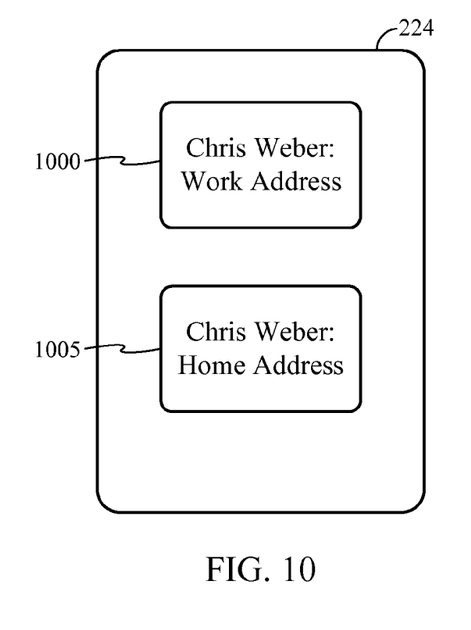
FIG. 10 illustrates a Multiple Location Selection Menu according to an aspect of the present invention.

Returning to 720, now assume that more than one location is stored for Chris Weber 915. In this case, the process advances to 725, and the user is prompted to select between different contact locations, as illustrated in FIG. 10. In FIG. 10, the user is prompted to select between a work address 1000 and home address 1005 for Chris Weber. Returning to FIG. 7, in 730, after the user makes the selection, the mobile device 200 updates the contact list for the user such that the default location for Chris Weber is set to the selected location from 725 (e.g., such that the next time the user selects navigation to Chris Weber 915 the default location can automatically be used if so desired by the user). The process then advances to 735, where the mobile device 200 determines its position (e.g., based on SPS or GPS, based on location information provided from a service provider, cellular-based position determination, or a hybrid SPS/cellular determination, etc.), and then provides turn-by-turn navigation to the selected location of Chris Weber, 740, as is known in the art.

Returning to 720, now assume that no locations are stored for Chris Weber 915. In this case, the process advances to 725, and the user is prompted to enter a location for Chris Weber 915 (e.g., via keypad entries inputted through the keypad 226, via touch-screen inputs at the display 224, etc.). In 730, after the user enters the location, the mobile device 200 updates the contact list for the user such that the Chris Weber contact includes the inputted location from 725. The process then advances to 735, where the mobile device 200 determines its position (e.g., based on SPS or GPS, based on location information provided from a service provider, cellular-based position determination, a hybrid SPS/cellular determination, etc.), and then provides turn-by-turn navigation and/or map information to the inputted location of Chris Weber, 740, as is known in the art. In an example, an option that permits the user to override the inputted location can also be provided (e.g., in case the wrong location is loaded).

Also, in another aspect of the present invention, the Find Destination Menu of FIGS. 5 and 8 could be "merged" such that both the Pull from Calendar icon 515 of FIG. 5 and the Pull from Contact List icon 800 of FIG. 8 are included in the Find Destination Menu. Thereby, from the navigation program, the user can optionally acquire navigation to destination addresses based on either the user's contact list or the user's calendar program.

As discussed above, conventional calendar programs can be configured to provide reminders to calendar users regarding an upcoming calendar event. For example, a user of the calendar program can configure the calendar program to provide a reminder an hour before a Board meeting, or 2 days before a birthday or anniversary, etc. Once the user sets the reminder timeframe, the calendar program provides the reminders as scheduled. In an aspect of the invention, reminders for calendar events that include location information can be configured based at least in part on the location information. For example, if a user is 50 miles from an airport, and a calendar event that corresponds to an airplane trip that leaves from the airport is in the calendar program, the reminder(s) can be established based on when the reminder(s) are determined to be most useful. For example, the calendar program can estimate how long it will take the user to get to the airport (e.g., based on current or expected traffic conditions, the user's current position and the airport's position), how much delay is expected to get through security lines at the airport, whether the flight is on-time or delayed and/or when boarding for the plane is scheduled to begin.

Accordingly, different types of information can be used to determine when to send the reminder aside from a manual user entry or default reminder time-frame. Thus, whereas conventional calendar programs have 'static' scheduling of reminders, aspects of the present invention can be directed to 'dynamic' scheduling of reminders (e.g., based at least in part on location information associated with a destination location of an upcoming calendar event).

The scheduling of the dynamic reminders can occur in response to any of a number of triggering events. For example, when a user enters a new calendar event into a calendar program with an associated location, the calendar program can compute when to send a reminder for the new calendar program, or whether to update an existing calendar event's reminder, based on the associated location. Thus, if a user adds a 2 PM haircut appointment to a calendar program with a 1 PM yoga class appointment, the calendar program can determine the reminder for the haircut appointment based on (i) the expected travel time between the yoga class and barber shop and/or (ii) when the user is expected to leave the yoga class.

In another example, the dynamic calendar event reminders can be periodically refreshed (e.g., once per day, once per hour, etc.). In this case, the refreshing of the dynamic calendar event counters can take into account changes to the calendar program (or changes to estimated travel times, traffic expectations, etc.) from a previous refresh-iteration.

In yet another example, the location of the user's mobile device can be tracked continuously, such that the dynamic reminders fluctuate as needed throughout the day. While more power intensive, this aspect permits the user to rely more upon the dynamic reminders because the mobile device can keep track of factors (e.g., current location, destination, estimated trip time) that can be used to determine when the user should leave his/her current location for the destination location of the calendar event.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of navigating, from a current position to a destination location, at a mobile device, comprising:
   launching a navigation program at the mobile device;
   receiving a selection of a contact from a contact list at the mobile device;
   determining that a plurality of locations are stored in association with the contact list for the selected contact;
   selecting the destination location from the plurality of locations of the selected contact by prompting a user to select one of the plurality of locations in response to the determination;
   generating navigation instructions from a current location of the mobile device to the destination location; and
   designating the destination location as a primary location that is configured for default selection without prompting the user a next time the selected contact is selected in association with the navigation program.

2. The method of claim 1, further comprising:
   receiving a selection of another contact from the contact list on the mobile device;
   determining that no locations are stored in association with the contact list for the selected another contact; and
   prompting the user to enter at least one location for the selected another contact based on the determination that no locations are stored in association with the contact list for the selected another contact.

3. The method of claim 2, further comprising:
   updating the contact list to include the at least one location for the selected another contact.

4. The method of claim 1, wherein the contact list is an address book maintained at the mobile device.

5. The method of claim 1, wherein the current location of the mobile device is obtained via one or more of a satellite positioning system (SPS) or a cellular-based positioning system.

6. The method of claim 1, further comprising:
   receiving a subsequent selection of the selected contact from the contact list at the mobile device in association with the navigation program;
   selecting the default location without prompting the user for a location selection in response to the subsequent selection; and
   generating navigation instructions from a subsequent current location of the mobile device to the default location.

7. A mobile communications device for navigating from a current position to a destination location, comprising:
   means for launching a navigation program at the mobile device;
   means for receiving a selection of a contact from a contact list at the mobile device;
   means for determining that a plurality of locations are stored in association with the contact list for the selected contact;
   means for selecting the destination location from the plurality of locations of the selected contact by prompting a user to select one of the plurality of locations in response to the determination;
   means for generating navigation instructions from a current location of the mobile device to the destination location; and
   means for designating the destination location as a primary location that is configured for default selection without prompting the user a next time the selected contact is selected in association with the navigation program.

8. A mobile communications device for navigating from a current position to a destination location, comprising one or more processors configured to:
   launch a navigation program at the mobile device;
   receive a selection of a contact from a contact list at the mobile device;
   determine that a plurality of locations are stored in association with the contact list for the selected contact;
   select the destination location from the plurality of locations of the selected contact by prompting a user to select one of the plurality of locations in response to the determination;
   generate navigation instructions from a current location of the mobile device to the destination location; and
   designate the destination location as a primary location that is configured for default selection without prompting the user a next time the selected contact is selected in association with the navigation program.

9. A non-transitory computer-readable storage medium comprising instructions, which, when executed by a mobile communications device within a wireless communications system for navigating from a current position to a destination location, cause the communication entity to perform operations, the instructions comprising:
   program code to launch a navigation program at the mobile device;
   program code to receive a selection of a contact from a contact list at the mobile device;
   program code to determine that a plurality of locations are stored in association with the contact list for the selected contact;
   program code to select the destination location from the plurality of locations of the selected contact by prompting a user to select one of the plurality of locations in response to the determination;
   program code to generate navigation instructions from a current location of the mobile device to the destination location; and
   program code to designate the destination location as a primary location that is configured for default selection without prompting the user a next time the selected contact is selected in association with the navigation program.

* * * * *